Oct. 24, 1961   F. C. DUGAN ET AL   3,005,643
BRAKING SYSTEM FOR TRUCK TRAILERS
Filed Nov. 4, 1960   3 Sheets-Sheet 1

INVENTORS
FRANK C. DUGAN
CHARLES F. MARTIN
BY
Gustav Miller
ATTORNEY.

Oct. 24, 1961   F. C. DUGAN ET AL   3,005,643
BRAKING SYSTEM FOR TRUCK TRAILERS
Filed Nov. 4, 1960   3 Sheets-Sheet 2

INVENTORS
FRANK C. DUGAN
CHARLES F. MARTIN
BY
Gustave Miller
ATTORNEY.

INVENTORS
FRANK C. DUGAN
CHARLES F. MARTIN
BY
ATTORNEY.

United States Patent Office 3,005,643
Patented Oct. 24, 1961

3,005,643
BRAKING SYSTEM FOR TRUCK TRAILERS
Frank C. Dugan and Charles F. Martin, both of
334 Ockley Drive, Shreveport, La.
Filed Nov. 4, 1960, Ser. No. 72,828
8 Claims. (Cl. 280—432)

This invention relates to improvements in brake actuating means for trailer trucks and the like, and it particularly relates to means for preventing jack-knifing of the trailer with the truck or tractor.

A long-standing problem pertaining to the so-called trailer trucks, which consists of an automotive drive portion called the truck or tractor, and a freight holding portion or trailer releasably coupled to the tractor, is the avoidance of continued inertial movement of the trailer in one direction after the tractor has either altered its direction of movement, or come to a stop. This continued inertial movement often causes jack-knifing of the truck or tractor and trailer relative to each other and may be the cause not only of damage to the trailer truck and goods being hauled, but also may cause serious damage or injury to other vehicles and persons riding both in the trailer truck and in the other vehicles.

Although various attempts have heretofore been made to solve this problem, none of these prior attempts has been wholly successful, either because the apparatus used was ineffective for its purpose when used under full loads or because the apparatus was so complex, bulky and heavy that it was unduly expensive, difficult to install and maintain and subject to easy breakdown.

It is one object of the present invention to overcome the aforesaid difficulties by providing a brake system for causing the trailer to automatically be halted in its inertial motion when the necessity arises, such action automatically taking place in accordance with the direction of movement of the truck or tractor, as well as with the degree of braking force required by the situation.

Another object of the present invention is to provide a braking system of the aforesaid type which is relatively simple in construction and operation and which is easy to install and maintain.

Other objects of the present invention are to provide an improved brake system, of the character described, that is easily and economically produced, which is sturdy in construction, and which is highly efficient in operation.

With the above and related objects in view, the present invention consists in the details of construction and combination of parts, as will be more fully understood from the following description, when read in conjunction with the accompanying drawings, in which.

Figure 1:
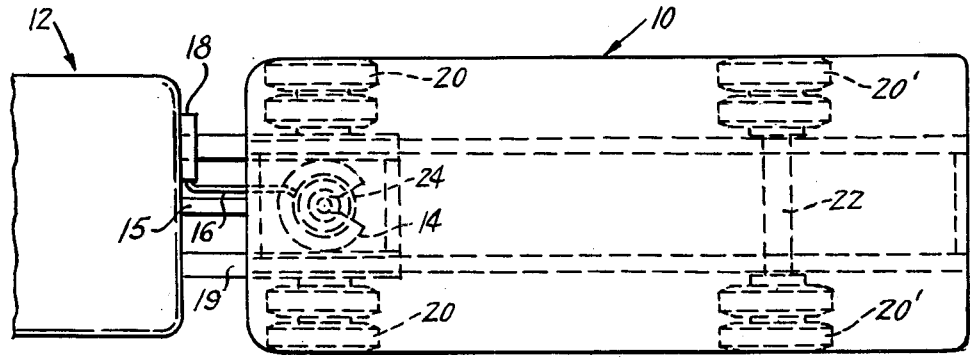
FIG. 1 is a top plan view of a trailer, showing its attachment to the truck or tractor and showing a brake system embodying the present invention connected thereto.

Referring in greater detail to the various figures of the drawings, wherein similar reference characters refer to similar parts, there is shown a trailer, generally designated 10, connected to a truck or tractor 12 by means of a fifth wheel 14 which is, in turn, connected by cable 16 to a control system housed in a casing 18 on the truck 12.

The truck or tractor 12 is provided with a rearwardly-extending rectangular frame 19 on opposite sides of which are positioned the rear wheels 20 of the truck. Supported within the frame 19 is the fifth wheel 14 mounted on an arm 15.

The trailer 10 is supported by a rear axle 22 having trailer wheels 20′ mounted thereon. These trailer wheels 20′ are controlled by pneumatic brakes in the usual manner. It is here to be understood that since gases and liquids are both fluids, although pneumatic brakes are illustrated as the embodiment of fluid pressure brakes, hydraulic brakes may also be used.

Figure 2:
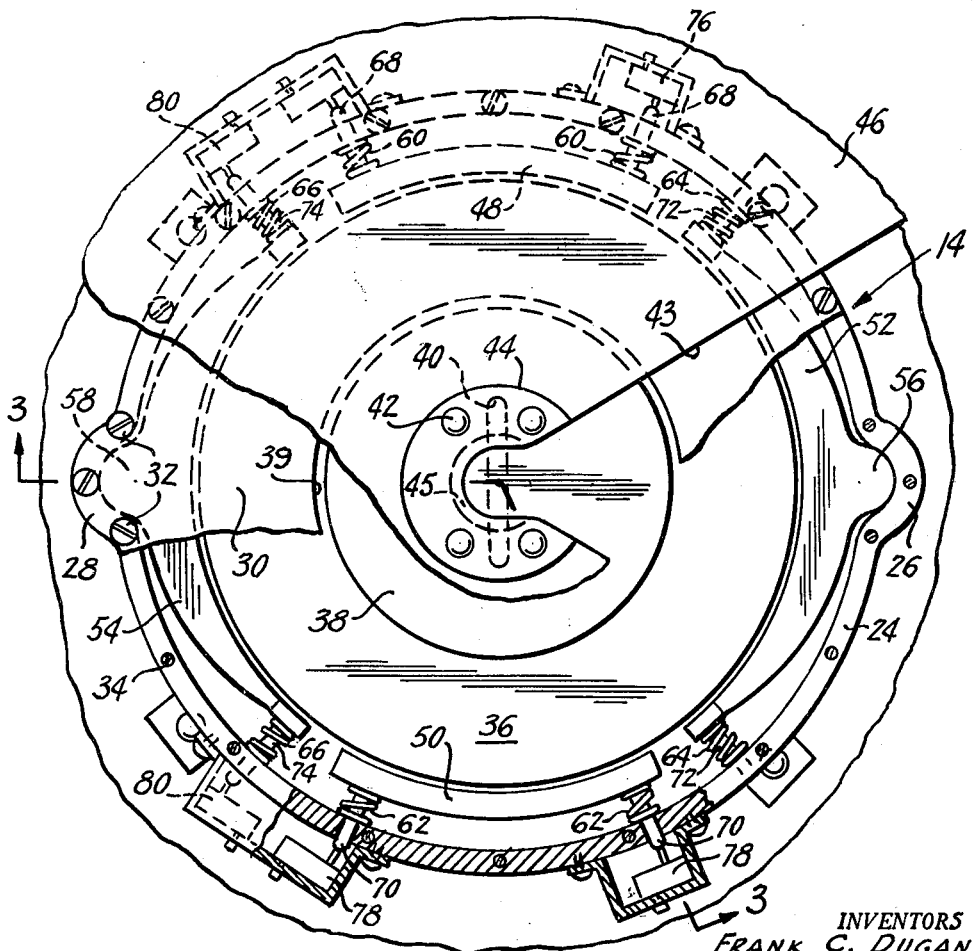
FIG. 2 is a top view, partly in section and partly in elevation, of a fifth wheel utilized in the brake system embodying the present invention.
Figure 3:
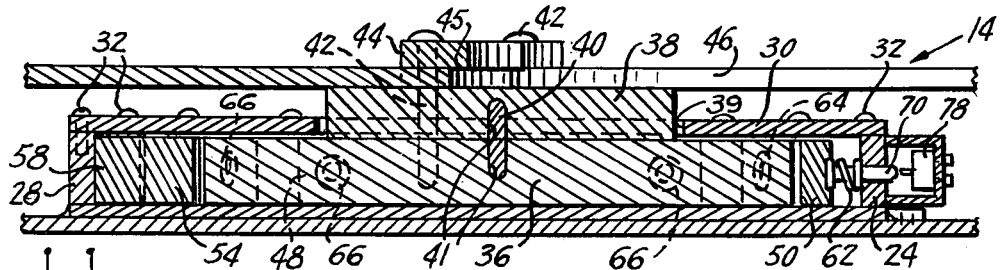
FIG. 3 is a sectional view taken on line 3—3 of FIG. 2.

The fifth wheel 14 (as best seen in FIGS. 2 and 3) comprises an outer cylinder or wall 24 having a pair of opposed, outwardly extending bearing ears 26 and 28. A cover 30 is releasably held on the top edge of the cylinder 24 by means of screws 32 held in threaded openings 34 in the top edge of the cylinder 24.

Beneath the top cover 30 and within the cylinder 24 is provided a circular disc 36 having a smaller disc 38, serving as a wear plate, extending through a central aperture 39 in the cover 30 and held on disc 36 by means of a key 40 which is positioned in complementary central key-ways 41 in the respective discs 36 and 38 (as best seen in FIG. 3).

Overlying the disc 38 is a circular top cover plate 46 having a rearwardly extending V-slot 43 with a small neck portion at its radially inner end. The plate 46 is held on the disc 38 by an open collar ring 44 having its opening coincident with the neck of the V-slot 43. Bolts 42 extend through the open collar ring 44, cover plate 46 and disc 38 and into disc 36, in order to clamp these parts together. However, these bolts 42 do not bear the shear stress of the load, which is taken by the key 40.

With the above type of construction, a draw bar or similar coupling means (not shown) can be inserted through the V-slot 43. The open collar ring 44 overlaps the neck of the V-slot 43 to form a shoulder 45 (see FIGS. 1 and 3) and this permits a yoke or the like on the draw bar to be clamped beneath the shoulder 45.

Between the periphery of the disc 36 and the cylindrical wall 24 are positioned a plurality of floating shoes comprising a pair of side shoes 48 and 50, a rear shoe 52 and a front shoe 54. Each shoe 48–54 is arcuate, and the front and rear shoes 54 and 52 are respectively provided with lugs 58 and 56 to fit into the respective bearings 28 and 26 so as to provide a swivel action.

The shoes 48–54 are individually biased radially inward toward disc 36 by a spring adjacent each end of each shoe. In this manner, shoe 48 is provided with a coil spring 60 adjacent each end, the shoe 50 is provided with a coil spring 62 adjacent each end, the shoe 52 is provided with a coil spring 64 adjacent each end, and the shoe 54 is provided with a coil spring 66 at each end.

Each of the coil springs 60–66 bear, at one end, against the inner surface of cylindrical wall 24 and, at the other end, against their respective shoes 48–54. In addition, each of the springs 60–66 encircles a pin extending from the respective shoes 48–54, these pins being respectively designated as 68 for the shoe 48, 70 for the shoe 50, 72 for the shoe 52 and 74 for the shoe 54.

All of the aforesaid pins except the pins 72 extend through a corresponding opening in the wall 24 and engage a corresponding contact of a respective individual microswitch, respectively designated 76 for pins 68, 78 for pins 70 and 80 for pins 72. Each of these switches 76–80 is connected in a solenoid valve circuit (illustrated in FIG. 4).

Figure 4:
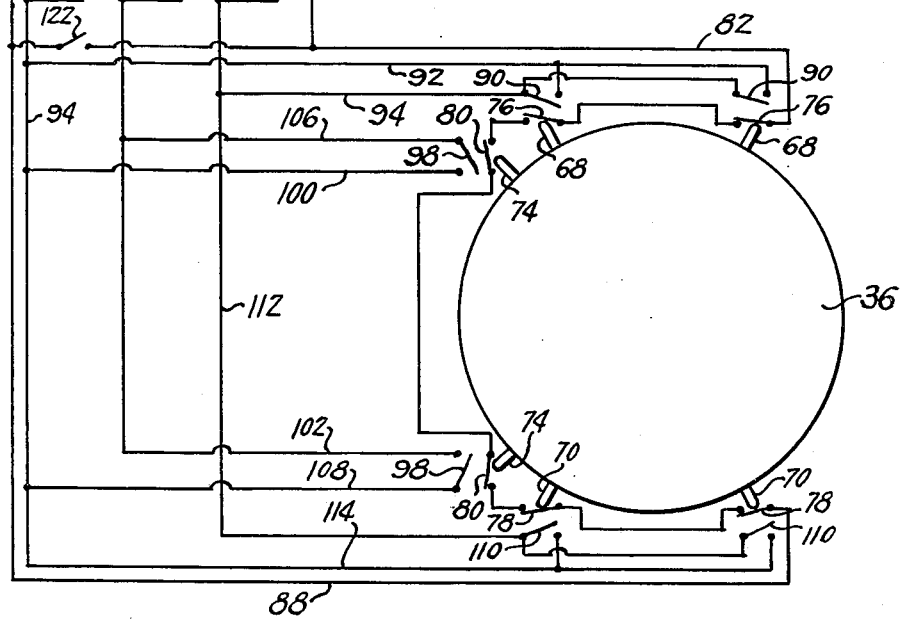
FIG. 4 is a diagrammatic view showing the relationship between the fifth wheel and the solenoid valve control circuit of the brake system.

As shown in FIG. 4, the switches 76, when closed, are connected at one side through line 82 to a solenoid valve 84 and thence to the source of energy through line 86, while at the other side, the switches 76 are connected through the other switches 78 and 80 and through line 88 to the source. When either of the switches 76 is opened, it acts to close one of the corresponding switches 90 which thereupon establishes a circuit through line 92 on one side to the source lead 94, and through line 94 on the other side to the solenoid valve 96.

When the other switches are closed and either of the switches 80 are open, it acts to close the corresponding switch 98 to establish a circuit through either line 100 or 102 to the solenoid valve 104, lines 106 and 108 connecting with source lead line 94.

Figure 5:
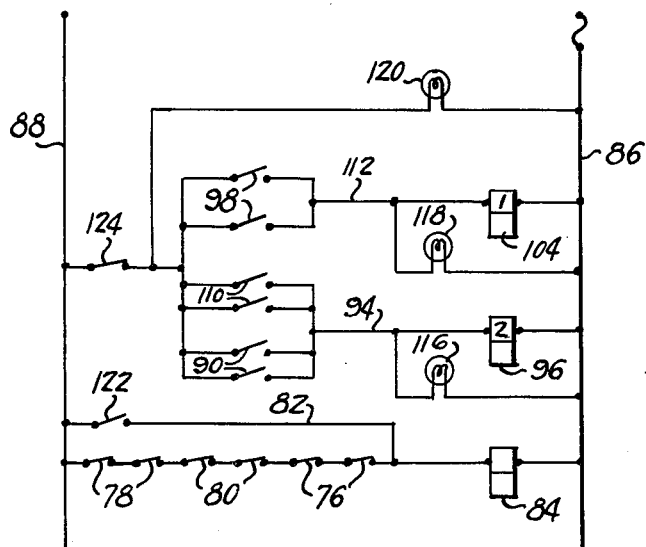
FIG. 5 is a schematic view of the solenoid electric circuit.

As illustrated in FIGS. 4 and 5, when the other switches are closed and either switch 78 is open, it acts to close the corresponding switch 110. This establishes a circuit through line 112 to the solenoid valve 96 while line 114 connects with the source line 94.

A signal lamp is connected in parallel with each of the valves 84, 96 and 104, these lamps being indicated respectively at 116, 118 and 120.

A switch 122 is provided in the line 82 and a switch 124 is provided in line 94, these switches 122 and 124 acting as control means for the circuit in accordance with the action of the truck.

Figure 6:
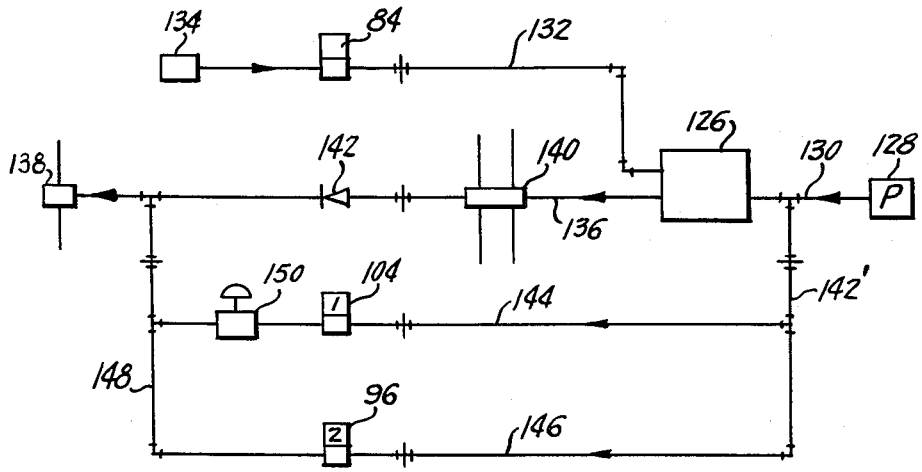
FIG. 6 is a schematic view of the fluid circuit utilized in the present brake system.

The fluid system is illustrated in FIG. 6 and comprises a foot control valve 126 in the cab of the truck 12. This valve 126 is connected to a source of fluid pressure, indicated at 128, through a line 130. The valve 126 is also connected through a fluid return line 132 to a fluid line coupler 134 adapted to be coupled to the brake system of the trailer 10. Solenoid valve 84 is interposed in line 132.

The valve 126 is also connected through line 136 to a coupler 138 leading to the trailer brake system. The truck brakes 140 and a check valve 142 are interposed in the line 136 between valve 126 and coupler 138.

A by-pass fluid line 142' connects the source 128 to two parallel lines 144 and 146, the solenoid valve 104 being interposed in line 144, and the solenoid valve 96 being interposed in line 146. A line 148 connects the parallel lines 144 and 146 with the coupler 138, while a fluid regulator for controlling the flow and pressure of the fluid is provided at 150 interposed in line 144 between the solenoid valve 104 and the line 148.

In operation, when the various switches are in normal position and the truck or tractor 12 is in line with the trailer 10, the solenoid valve 84 is open and permits the fluid, such as air, to flow through the return line 132 from the trailer brake system back to the valve 126 and source 128. When the truck or tractor 12 assumes an out of line position relative to the trailer 10, the corresponding floating shoes 48–54 will push against the corresponding coil springs under pressure of the floating disc 36. This displacement will push the corresponding pin 68, 70 or 72 at the corresponding end of the shoe to, in turn, push the corresponding switch 76, 78 or 80. This establishes the respective electrical circuit to either solenoid valve 96 or solenoid valve 104, opening the selected valve 96 or 104 and closing valve 84. The rear shoe 52 is not provided with switch means because its only controlling vector force is rearward which is still an aligned force, and any side sway is taken care of by the other shoes. It should be noted that the front shoe 54 actuates solenoid valve 104 through the pressure regulator 150 so that only a relatively small pressure is applied against the trailer brakes. This is because the front shoe 54 is actuated only by a relatively slight misalignment. However, where the pressure applied by shoe 54 is not sufficient due to too great a misalignment, the shoes 48 or 50 will be actuated and will apply a greater pressure through solenoid valve 96.

When the trailer 10 gets back into alignment with the truck or tractor 12, the solenoid valves 96 and 104 will return to their normally closed position because their respective shoes 48, 50 or 54 will be spring-pressed back to their normal positions, disengaging their respective microswitches 76, 78 or 80. At the same time, the solenoid valve 84 opens to permit a return flow through line 132 to release the pressure on the trailer brakes.

The control switches 122 and 124 are, respectively, normal open and closed switches, as indicated in FIGS. 4 and 5, and are provided on the reverse lever in the truck.

Although this invention has been described in considerable detail, such description is intended as being illustrative rather than limiting, since the invention may be variously embodied, and the scope of the invention is to be determined as claimed.

Having thus set forth and described the nature of this invention, what is claimed is:

1. In a tractor-trailer assembly, a trailer brake system comprising a fifth wheel device which includes a cylindrical wall, a disc within said wall, means connecting said fifth wheel to the trailer, a plurality of floating shoes between the outer periphery of the disc and the inner surface of said cylindrical wall, biasing means adjacent opposite ends of each shoe, said biasing means urging their respective shoes radially inward toward said disc, a switch contact means adjacent opposite ends of at least some of said shoes, a switch means on said cylindrical wall for each contact means, said switch means being arranged in an electrical network wherein the switch means for each of the shoes are individually electrically connectable to selected solenoid valves upon radial movement of said shoes, said solenoid valves being interposed in respective parallel fluid circuits between a source of fluid pressure and fluid-actuated trailer brakes, one of said parallel fluid circuits providing a fluid flow of greater pressure than the other, and a return-flow solenoid valve interposed in a return fluid circuit from said trailer brakes to said source of fluid pressure, said return-flow valve being alternatively opened and closed relative to said first mentioned solenoid valves.

2. The assembly of claim 1, and a direct fluid circuit between said source of fluid pressure and said trailer brakes, a selectively operated valve in said direct fluid circuit, tractor brakes in said direct fluid circuit between said selectively operated valve and said trailer brakes, and a check valve in said direct fluid circuit between said tractor brakes and said trailer brakes, said check valve being constructed and arranged to prevent fluid flow toward said source of fluid pressure while permitting flow toward said trailer brakes.

3. The assembly of claim 1, said parallel fluid circuit having the lesser pressure being provided with a pressure regulator between its respective solenoid valve and said trailer brakes.

4. The assembly of claim 1, and a signal lamp in parallel circuit with each of said solenoid valves.

5. In a tractor-trailer assembly wherein the tractor and trailer have their separate brake means, a fifth wheel device on said tractor releasably connected to said trailer, said fifth wheel device comprising a plurality of circumferentially arranged floating shoes positioned within a cylindrical wall, said shoes being spring-pressed radially inward and at least some of said shoes having electrical switch contact pins connected thereto, said contact pins being selectively engageable with corresponding electrical switch means on said cylindrical wall upon predetermined outward radial movement of their respective shoes, solenoid valve control means operatively connected to said switch means, and variable pressure fluid inlet means connecting the trailer brake means to a source of fluid pressure, said variable means being selectively actuated by said solenoid valve control means in accordance with the radial position of the corresponding shoes relative to said cylindrical wall.

6. The assembly of claim 5, said variable pressure fluid inlet means comprising by-pass circuits between said source of fluid pressure and said trailer brake means, there being a main fluid circuit between said source of fluid pressure and said trailer brake means, said main circuit having a control valve and a check valve interposed therein, said control valve being connected to a return-flow circuit having a solenoid valve therein opening and closing in alternative relation to said first mentioned solenoid valve control means, and said check valve being constructed and arranged to permit fluid flow only in the direction from the source of fluid pressure to the trailer brake means.

7. The assembly of claim 5, said shoes constituting a front shoe, a rear shoe and oppositely disposed side shoes, said front and rear shoes having individual swivel connections with said cylindrical wall, and only the front and side shoes being provided with electrical switch contact pins.

8. The assembly of claim 5, and a disc positioned in said cylindrical wall radially inwardly of said shoes, said disc having the releasable connection to said tractor.

References Cited in the file of this patent

UNITED STATES PATENTS

| | | |
|---|---|---|
| 2,201,353 | Soulis | May 21, 1940 |
| 2,213,221 | Johnson | Sept. 3, 1940 |
| 2,259,923 | Byrne et al. | Oct. 21, 1941 |
| 2,976,964 | Thompson | Mar. 28, 1961 |